(12) United States Patent
Qi et al.

(10) Patent No.: US 9,062,219 B2
(45) Date of Patent: Jun. 23, 2015

(54) SUPERHYDROPHOBIC NANO-FABRICS AND COATINGS

(75) Inventors: Yu Qi, Oakville (CA); Nan-Xing Hu, Oakville (CA); Qi Zhang, Mississauga (CA); Gail Song, Milton (CA); Sandra Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 645 days.

(21) Appl. No.: 12/356,781

(22) Filed: Jan. 21, 2009

(65) Prior Publication Data

US 2010/0184346 A1 Jul. 22, 2010

(51) Int. Cl.
*G03G 13/00* (2006.01)
*C09D 7/12* (2006.01)
*B82Y 30/00* (2011.01)
*C09D 5/16* (2006.01)
*G03G 15/00* (2006.01)
*B82Y 40/00* (2011.01)
(Continued)

(52) U.S. Cl.
CPC .............. *C09D 7/1291* (2013.01); *Y10T 428/25* (2015.01); *G03G 13/00* (2013.01); *G03G 15/00* (2013.01); *B82Y 40/00* (2013.01); *B82Y 30/00* (2013.01); *C08K 3/04* (2013.01); *C08K 9/08* (2013.01); *C09D 5/1662* (2013.01)

(58) Field of Classification Search
CPC ....... G03G 13/00; G03G 15/00; B82Y 30/00; B82Y 40/00
USPC ................................................ 442/59, 79, 77
See application file for complete search history.

(56) References Cited

U.S. PATENT DOCUMENTS 4,842,944 A 6/1989 Kuge et al.
5,187,849 A 2/1993 Kobayashi
(Continued)

FOREIGN PATENT DOCUMENTS

CN 1892501 A 1/2007
EP 1580514 9/2008
(Continued)

OTHER PUBLICATIONS

Lau, Kenneth K.S., "Superhydrophobic Carbon Nanotube Forests," Oct. 22, 2003, Nano Letters, vol. 3, No. 12, pp. 1701-1705.*
(Continued)

*Primary Examiner* — Peter Y Choi
(74) *Attorney, Agent, or Firm* — MH2 Technology Law Group LLP

(57) ABSTRACT

In accordance with the invention, there are articles including hydrophobic composite coating and methods of forming a hydrophobic composite coating. The method of forming a hydrophobic composite coating can include providing a substrate, wherein the substrate can include at least one region. The method can also include providing a dispersion including a plurality of carbon nanotubes, a stabilizer, a hydrophobic polymer, and a solvent, wherein the plurality of carbon nanotubes can be selected from the group consisting of single wall carbon nanotubes and multiple wall carbon nanotubes, and wherein each of the plurality of carbon nanotubes has an aspect ratio of at least about 10. The method can further include applying the dispersion to the one region to form a coated substrate and heating the coated substrate to form a hydrophobic composite coating such that the hydrophobic composite coating has a water contact angle of at least about 120°.

15 Claims, 2 Drawing Sheets

(51) Int. Cl.
*C08K 3/04* (2006.01)
*C08K 9/08* (2006.01)

(56) References Cited

U.S. PATENT DOCUMENTS

| | | | |
|---|---|---|---|
| 5,204,156 A * | 4/1993 | Lumb et al. | 428/96 |
| 5,485,259 A | 1/1996 | Uehara et al. | |
| 5,547,759 A | 8/1996 | Chen et al. | |
| 5,649,273 A | 7/1997 | Shimizu et al. | |
| 5,788,770 A | 8/1998 | Hobson et al. | |
| 5,846,643 A | 12/1998 | Badesha et al. | |
| 6,099,673 A | 8/2000 | Van Bennekom | |
| 6,143,675 A * | 11/2000 | McCollam et al. | 442/221 |
| 6,295,434 B1 * | 9/2001 | Chang et al. | 399/297 |
| 6,375,870 B1 | 4/2002 | Visovsky et al. | |
| 6,514,650 B1 * | 2/2003 | Schlueter et al. | 430/56 |
| 6,664,336 B1 | 12/2003 | Tomihashi et al. | |
| 6,668,152 B1 | 12/2003 | Jacob | |
| 6,927,006 B2 | 8/2005 | Finn et al. | |
| 7,441,745 B2 | 10/2008 | Kawaguchi et al. | |
| 2002/0084553 A1 | 7/2002 | Nun et al. | |
| 2002/0150723 A1 | 10/2002 | Oles et al. | |
| 2002/0197553 A1 | 12/2002 | Pickering et al. | |
| 2003/0054155 A1 * | 3/2003 | Nomi et al. | 428/306.6 |
| 2005/0181195 A1 * | 8/2005 | Dubrow | 428/297.4 |
| 2006/0018026 A1 | 1/2006 | Bastawros et al. | |
| 2006/0156475 A1 * | 7/2006 | Oles et al. | 8/115.51 |
| 2006/0292360 A1 * | 12/2006 | Hays et al. | 428/323 |
| 2007/0031639 A1 | 2/2007 | Hsu et al. | |
| 2007/0120095 A1 | 5/2007 | Gruner | |
| 2007/0292660 A1 | 12/2007 | Kikukawa | |
| 2008/0152896 A1 | 6/2008 | Moorlag et al. | |
| 2008/0306202 A1 | 12/2008 | Lin et al. | |
| 2009/0016790 A1 | 1/2009 | Funabiki | |
| 2009/0123185 A1 | 5/2009 | Lin et al. | |
| 2009/0324308 A1 | 12/2009 | Law et al. | |
| 2010/0055450 A1 | 3/2010 | Qi et al. | |
| 2010/0137499 A1 | 6/2010 | Moorlag et al. | |
| 2010/0183864 A1 | 7/2010 | Qi et al. | |
| 2011/0183114 A1 | 7/2011 | Kim et al. | |
| 2011/0183265 A1 | 7/2011 | Kim et al. | |

FOREIGN PATENT DOCUMENTS

| | | |
|---|---|---|
| JP | S629377 A | 1/1987 |
| JP | H0380277 A | 4/1991 |
| JP | 06186881 A | 7/1994 |
| JP | H07191567 A | 7/1995 |
| JP | 11194640 A | 7/1999 |
| JP | 2004294049 A | 10/2004 |
| JP | 2005132919 A | 5/2005 |
| JP | 2005144751 A | 6/2005 |
| JP | 2006126595 A | 5/2006 |
| JP | 2007304374 A | 11/2007 |
| JP | 2008156646 A | 7/2008 |
| WO | 2004097853 A1 | 11/2004 |
| WO | 2007001405 | 1/2007 |
| WO | 2007024206 | 3/2007 |
| WO | 2008046166 | 4/2008 |
| WO | 2008085550 | 7/2008 |

OTHER PUBLICATIONS

European Patent Office, European Search Report, European Application No. 10150822, Apr. 9, 2010, 9 Pages.

XP002575929, Database WPI Week 200541, Thomson Scientific London, GB; AN 2005-398495 & JP 2005 132919, May 26, 2005, 3 Pages.

Author Unknown, PTFE Porous Membranes Product Specification, available at http://www.3dsro.sk/datasheet/classicfilters/051-Membranes.pdf, 2014, 1 page.

First Office Action dated Apr. 17, 2013, Chinese Patent Application No. 201010001677.9, pp. 1-13.

European Search Report dated Mar. 31, 2010, European Application No. 10151211.9, pp. 1-3.

Toshihiro Tanimura, Summary of Japanese Office Action dated Jan. 28, 2014, Japanese Patent Application No. 2010-009013 filed Jan. 19, 2010, pp. 1-4.

Ken-Ichi Tanuma, Summary of Japanese Office Action dated Mar. 25, 2014, Japanese Patent Application No. 2010-009012 filed Jan. 19, 2010, pp. 1-3.

First Office Action dated Jun. 13, 2013, Canadian Patent Application No. 2,690,225 filed Jan. 14, 2010, pp. 1-3.

Advisory Action dated Dec. 23, 2013, U.S. Appl. No. 12/356,933, filed Jan. 21, 2009, pp. 1-3.

Final Office Action dated Oct. 23, 2013, U.S. Appl. No. 12/356,933, filed Jan. 21, 2009, pp. 1-23.

Non-Final Office Action dated May 23, 2013, U.S. Appl. No.12/356,933, filed Jan. 21, 2009, pp. 1-16.

Advisory Action dated Jul. 5, 2012, U.S. Appl. No. 12/356,933, filed Jan. 21, 2009, pp. 1-4.

Final Office Action dated May 31, 2012, U.S. Appl. No. 12/356,933, filed Jan. 21, 2009, pp. 1-13.

Non-Final Office Action dated Sep. 16, 2011, U.S. Appl. No. 12/356,933, filed Jan. 21, 2009, pages.

Non-Final Office Action dated Feb. 10, 2014, U.S. Appl. No. 12/356,933, filed Jan. 21, 2009, pp. 1-15.

Yu Qi et al., "Fuser Topcoats Comprising Superhydrophobic Nano-Fabric Coatings", U.S. Appl. No. 12/356,933, filed Jan. 21, 2009.

Yu Qi et al., "CNT/Fluoropolymer Coating Composition", U.S. Appl. No. 12/198,460, filed Aug. 26, 2008.

* cited by examiner

SUPERHYDROPHOBIC NANO-FABRICS AND COATINGS

DESCRIPTION OF THE INVENTION

1. Field of the Invention

The present invention relates to hydrophobic nano-fabrics and coatings and methods of fabricating them.

2. Background of the Invention

Superhydrophobic surfaces and coatings possess so called "lotus leaf effect" with unique properties, such as anti-contamination, anti-sticking, and self-cleaning. These properties are desirable for many industrial and biological applications such as, for example, anti-biofouling paints for boats, anti-sticking of snow for antennas and windows, self-cleaning windshields for automobiles, metal refining, stain resistant textiles, anti-soiling architectural coatings. Furthermore, these properties are especially sought-after for long life xerographic components such as oil-less fusers, self-cleaning intermediate transfer belt (ITB), and the like. Among all the available materials used for the fabrication of superhydrophobic surfaces and coatings, carbon nanotubes are of great interest due to their remarkable mechanical properties, as well as other unique properties such as electrical conductivity and chemical resistance. Currently, the only known process for the fabrication of the superhydrophobic carbon nanotube structures is plasma enhanced chemical vapor deposition (PECVD), which has practical limitations.

Accordingly, there is a need to provide a simple coating process for the fabrication of hydrophobic surfaces and coatings.

SUMMARY OF THE INVENTION

In accordance with various embodiments, there is an article including a surface, wherein the surface can include at least one region. The article can also include a hydrophobic composite coating disposed over the one region, wherein the hydrophobic composite coating can include a plurality of carbon nanotubes dispersed in a hydrophobic polymer, and wherein the hydrophobic composite coating has a water contact angle of least about 120°.

According to various embodiments, there is a method of forming a hydrophobic composite coating. The method can include providing a substrate, wherein the substrate can include at least one region. The method can also include providing a dispersion including a plurality of carbon nanotubes, a stabilizer, a hydrophobic polymer, and a solvent, wherein the plurality of carbon nanotubes can be selected from the group consisting of single wall carbon nanotubes and multiple wall carbon nanotubes, and wherein each of the plurality of carbon nanotubes has an aspect ratio of at least about 10. The method can further include applying the dispersion to the one region to form a coated substrate and heating the coated substrate to form a hydrophobic composite coating such that the hydrophobic composite coating has a water contact angle of at least about 120°.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the terms "hydrophobic" and "hydrophobicity" refer to the wettability of a surface (e.g., a coating surface) that has a water contact angle of approximately 90° or more and the terms "superhydrophobic" and "superhydrophobicity" refer to the wettability of a surface (e.g., a coating surface) that has a water contact angle of approximately 150° or more and very low contact angle hysteresis ($\Delta\theta = \theta_A - \theta_B < 1$).

Figure 1:
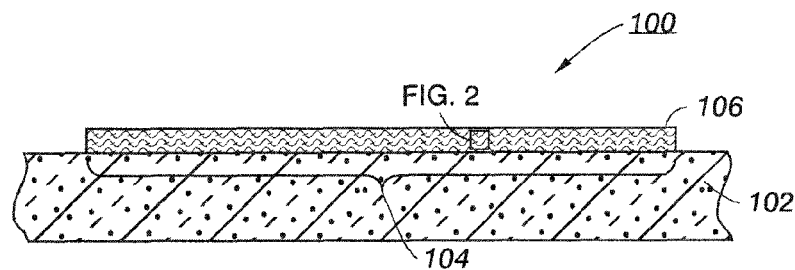
FIG. 1 schematically illustrates an exemplary article, according to various embodiments of the present teachings.

FIG. 1 schematically illustrates an exemplary article 100, according to various embodiments of the present teachings. The exemplary article 100 can include a surface 102, wherein the surface can include at least one region 104, as shown in FIG. 1. The surface 102 can include any suitable material, such as, for example, glass, silicon, metals, ceramics, fibers, and plastics. Exemplary region 104 can include, but is not limited to, a top surface, such as, a region exposed to an environment; metal surface such as aluminum, stainless steel; ceramic; fibers; glass; and plastics such as polyimides. The exemplary article 100 can also include a hydrophobic composite coating 106 disposed over the at least one region 104, wherein the hydrophobic composite coating 106 can include a plurality of carbon nanotubes dispersed in a hydrophobic polymer, and wherein the hydrophobic composite coating 106 has a water contact angle of about 120° or more. The hydrophobic composite coating 106 can have any suitable thickness. However, in some embodiments, the hydrophobic composite coating 106 can have a thickness in the range of about 100 nm to about 100 µm.

Figure 2:
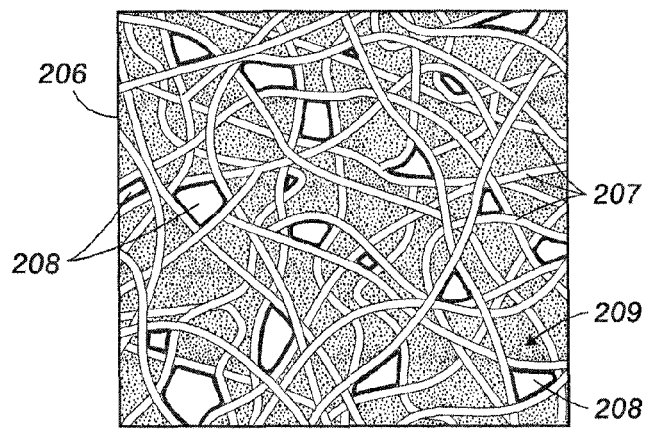
FIG. 2 schematically illustrates an exemplary hydrophobic composite coating, according to various embodiments of the present teachings.

FIG. 2 is a schematic illustration of an exemplary hydrophobic composite coating 206 including a plurality of non-aligned carbon nanotubes 207 dispersed in the hydrophobic polymer 209. In some embodiments, the hydrophobic composite coating 106, 206 can include a porous fabric with a plurality of pores 208, as shown in FIG. 2. The plurality of pores 208 can be filled with any suitable material, such as, for example, air, a hydrophobic polymer, and a mixture thereof. In some cases, the pore size can range from about 0.01 µm to about 10 µm and in other cases from about 0.05 µm to about 5 µm. In some embodiments, the carbon nanotubes 207 can be physically bonded to the hydrophobic polymer 209. In other embodiments, the carbon nanotubes 207 can be chemically bonded to the hydrophobic polymer 209. The term "chemical bonding", as used herein, refers to covalent bonding and/or ionic bonding formed as a result of chemical reaction between the carbon nanotubes 207 and the hydrophobic polymer 209. The term "physical bonding", as used herein, refers to any kind of bonding besides chemical bonding, such as, for example, hydrogen bonding, van der Waals interaction.

In various embodiments, the plurality of carbon nanotubes 207 can include one or more of a plurality of single-walled carbon nanotubes (SWNT) and a plurality of multi-walled carbon nanotubes (MWNT). In some embodiments, carbon nanotubes can be one or more of semiconducting carbon nanotubes and metallic carbon nanotubes. In certain embodiments, each of the plurality of carbon nanotubes 107, 207 can have an aspect ratio of at least about 10. However, the carbon nanotubes can be of different lengths, diameters, and/or chiralities. The carbon nanotubes can have a diameter from about 0.5 nm to about 50 nm and length from about 100 nm to a few mm. In some cases, the carbon nanotubes 207 can be present in an amount of from about 5 to about 95 percent by weight of the total solid weight of the hydrophobic composite coating 106, 206 and in other cases from about 10 to about 90 percent by weight of the total solid weight of the hydrophobic composite coating 106, 206.

In some embodiments, the hydrophobic polymer 209 can include silicones, polyperfluoropolyethers, or a polymer having one or more monomer repeat units selected from the group consisting of ethylene, propylene, a styrene, tetrafluoroethylene, vinylidene fluoride, hexafluoropropylene, perfluoro(methyl vinyl ether), perfluoro(propyl vinyl ether), perfluoro(ethyl vinyl ether), and the mixtures thereof. In other embodiments, the hydrophobic polymer 209 can include a fluoropolymer having one or more monomer repeat units selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and the mixtures thereof. Exemplary hydrophobic polymer 209 can include, but is not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

In various embodiments, the hydrophobic composite coating 106, 206 can have an electrical surface resistivity of less than about 1000 Ω/sq.

Figure 3:
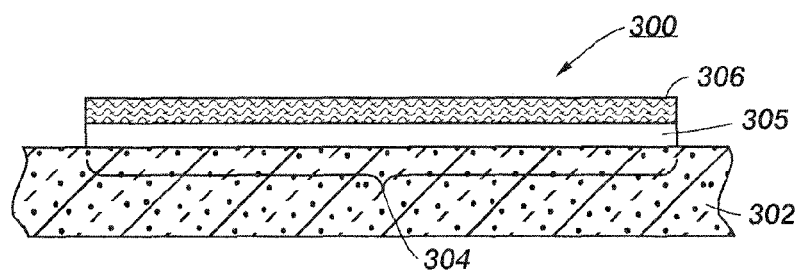
FIG. 3 schematically illustrates another exemplary article, according to various embodiments of the present teachings.

FIG. 3 schematically illustrates another exemplary article 300 including an intermediate layer 305 disposed over a surface 302 and a hydrophobic composite coating 306 disposed over the intermediate layer 305, wherein the intermediate layer 305 can be porous with an average pore size of less than about 0.1 µm. In some embodiments, the intermediate layer 305 can be disposed only over the one region, as shown in FIG. 3. In other embodiments (not shown), the intermediate layer 305 can be disposed over the entire surface 302. The intermediate layer 305 can have any suitable thickness. However, in some applications, the intermediate layer 305 can have a thickness in the range of about 50 nm to 600 µm and in other applications, in the range of about 100 nm to 500 µm. In various embodiments, the intermediate layer 305 can include a plurality of carbon nanotubes dispersed in another hydrophobic polymer. In some cases, the another hydrophobic polymer of the intermediate layer 305 can be different from the hydrophobic polymer of the hydrophobic composite coating 306. In other cases, the another hydrophobic polymer of the intermediate layer 305 can be the same as the hydrophobic polymer of the hydrophobic composite coating 306.

The disclosed exemplary hydrophobic composite coating 106, 206, 306 including a plurality of carbon nanotubes dispersed in a hydrophobic polymer is believed to possess both the mechanical and electrical properties of the carbon nanotubes and the low surface energy and chemical inertness of the hydrophobic polymers. The disclosed exemplary hydrophobic composite coating 106, 206, 306 can be used for a wide variety of applications, including, but not limited to, anti-biofouling paint for boats; anti-stick coating for antennas, windows; self-cleaning windshields for automobiles; metal refining; stain resistant textiles; anti-soiling for architectural coatings. Furthermore, the disclosed exemplary hydrophobic composite coating 106, 206, 306 can be used for xerographic components such as oil-less fusers, self-cleaning ITB, and the like. Hence, exemplary article 100, 300 can include, but is not limited to a boat, a partially and fully submerged structure in water, an antenna, a window, an automobile, a building, a textile, and components of a xerographic printer, such as, for example, oil-less fusers, and self-cleaning ITBs.

Figure 4:
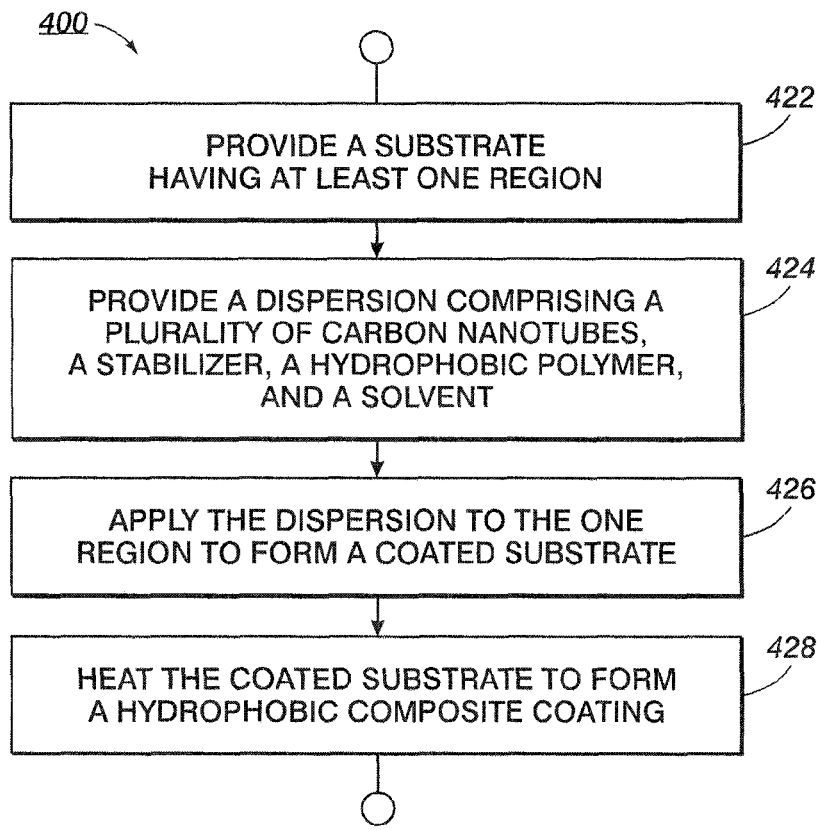
FIG. 4 shows an exemplary method of forming a hydrophobic composite coating, in accordance with various embodiments of the present teachings.

FIG. 4 schematically illustrates an exemplary method 400 of forming a hydrophobic composite coating. The method 100 can include a step 422 of providing a substrate, wherein the substrate includes at least one region. In various embodiments, step 422 of providing a substrate can include providing a substrate such as, for example, glass, silicon, metals, ceramics, fibers, and plastics. The method 100 can also include a step 424 of providing a dispersion including a plurality of carbon nanotubes, a stabilizer, a hydrophobic polymer, and a solvent. The plurality of carbon nanotubes can be one or more of a plurality of single wall carbon nanotubes and a plurality of multiple wall carbon nanotubes, and wherein each of the plurality of carbon nanotubes can have an aspect ratio of at least about 10. Any suitable stabilizer can be used, such as, for example, a polymeric amine, a polymeric amine salt, a polymeric acid, a conjugated polymer, and a natural gum material. Exemplary stabilizer can include, but is not limited to polyallylamine, polyethylenimine, poly(diallyldimethylammonium chloride), poly(allylamine hydrochloride), and mixtures thereof; poly(acrylic acid), poly(3,4-ethylenedioxythiophene), poly(3,4-ethylenedioxythiophene) complexes with a polymeric acid, Gum Arabic, chitosan, and mixtures thereof. In various embodiments, the hydrophobic polymer can include one or more of silicones, polyperfluoropolyethers, and a polymer having one or more monomer repeat units selected from the group consisting of ethylene, propylene, a styrene, tetrafluoroethylene, vinylidene fluoride, hexafluoropropylene, perfluoro(methyl vinyl ether), perfluoro(ethyl vinyl ether), and perfluoro(propyl vinyl ether). Exemplary hydrophobic polymer can include, but is not limited to, polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP). In some cases, the hydrophobic polymer can be a colloid. In other cases, the hydrophobic polymer can be a latex. Yet, in some other cases, the hydrophobic polymer can be a suspension. Any suitable solvent can be used, including, but not limited to water, an alcohol, a $C_5$-$C_{18}$ aliphatic hydrocarbon, a $C_6$-$C_{18}$ aromatic hydrocarbon, an ether, a ketone, an amide, and the mixtures thereof.

The method 400 can further include a step 426 of applying the dispersion to the one region of the substrate to form a coated substrate. Any suitable technique can be used for applying the dispersion to the one region of the substrate, such as, for example, spray coating, dip coating, brush coating, roller coating, spin coating, casting, and flow coating. In certain embodiments, the step 426 of applying the dispersion to the one region to form a coated substrate can include forming an intermediate layer over the one region, wherein the intermediate layer can be porous with pore size of less than about 0.1 µm and applying the dispersion over the intermediate layer to form a coated substrate. In some embodiments, the intermediate layer can be formed over the entire surface, including the one region. In various embodiments, the intermediate layer can include a plurality of carbon nanotubes dispersed in another hydrophobic polymer. In some cases, the another hydrophobic polymer of the intermediate layer can be different from the hydrophobic polymer of the dispersion. In other cases, the another hydrophobic polymer of the intermediate layer can be the same as the hydrophobic polymer of the dispersion.

The method 400 can also include a step 428 of heating the coated substrate at a temperature in the range of about 200° C. to about 400° C. to form a hydrophobic composite coating, wherein the hydrophobic composite coating can have a water contact angle about 120° or more. While not bound by any theory, it is also believed that the stabilizer and the solvent either evaporate or disintegrate during the heating and/or drying process, leaving only the carbon nanotubes and the hydrophobic polymer in the hydrophobic composite coating. In various embodiments, the hydrophobic composite coating can include a porous fabric with pore size ranging from about 0.1 µm to about 5 µm.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of a CNT Aqueous Dispersion

About 1 weight % poly(allylamine) solution was formed by dissolving about 10 g of about 20 weight % poly(allylamine) aqueous solution in about 117 g of water and 3 g of 6N hydrochloric acid solution. A carbon nanotube (CNT) aqueous dispersion was formed by adding about 1 g (about 1 part) of multi-walled carbon nanotubes (CNT) to about 99 g (about 99 parts) of poly(allylamine) solution and sonicating the solution using a probe sonicator for about 10 times with a duration of about 1 minute each time. The resulting CNT aqueous dispersion had an average particle size of about 250 nm, as measured by a particle analyzer (Nanotrac 252, Microtrac Inc., North Largo, Fla.).

Example 2

Preparation of a Coating Dispersion

About 0.167 g of about 60 wt % perfluoroalkoxy polymer (PFA) dispersion obtained from DuPont was mixed with about 10 g of CNT aqueous dispersion of Example 1 and the resulting coating dispersion was roll-milled for about 2 minutes on a rotator Movil-Rod (Eberbach Corp., Ann Arbor, Mich.).

Example 3

Preparation of a Hydrophobic Composite Coating

The coating dispersion of Example 2 was spray coated on a silicon wafer and the resulting coating layer was baked at about 360° C. for about 10 minutes. The scanning electron microscopy (SEM) of the coated silicon showed that carbon nanotubes (CNT) were uniformly distributed in the hydrophobic composite coating. The water contact angle was measured to be about 140°. Further experiments showed that the water contact angles (WCA) of the hydrophobic composite coating increased with the increase in the CNT concentration, reaching about 150° at about 50% CNT loading.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more" of with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An article comprising:
   a surface, wherein the surface comprises at least one region; and a hydrophobic composite coating disposed over the at least one region, the hydrophobic composite coating being positioned on the surface so as to be exposed to an environment, wherein the hydrophobic composite coating comprises a plurality of non-aligned carbon nanotubes dispersed in a fluoropolymer, the hydrophobic composite coating comprising a sufficient amount of carbon nanotubes to have a water contact angle of least 140°, the hydrophobic composite coating comprising a carbon nanotube loading ranging from about 50% to about 95% by weight of the total solid weight of the hydrophobic composite coating, wherein the hydrophobic composite coating is a porous fabric comprising pores with pore sizes ranging from 0.1 µm to about 5 µm, an intermediate layer disposed between the one region and the hydrophobic composite coating, wherein the intermediate layer is porous with an average pore size of less than 0.1 µm, wherein the fluoropolymer is selected from a group consisting of polytetrafluoroethylene (PTFE) and perfluoroalkoxy polymer resin (PFA).

2. The article of claim 1, wherein the plurality of non-aligned carbon nanotubes are physically or chemically bonded to the hydrophobic polymer.

3. The article of claim 1, wherein the plurality of non-aligned carbon nanotubes is selected from the group consisting of single wall carbon nanotubes and multiple wall carbon nanotubes, and wherein each of the plurality of carbon nanotubes has an aspect ratio of at least about 10.

4. The article of claim 1, wherein the hydrophobic composite coating has an electrical surface resistivity of less than about 1000 Ω/sq.

5. The article of claim 1, wherein the hydrophobic composite coating is disposed over a surface selected from the group consisting of glass, silicon, metals, ceramics, fibers, and plastics.

6. The article of claim 1, wherein the hydrophobic composite coating is formed by mixing the plurality of non-aligned carbon nanotubes and the hydrophobic polymer to form a dispersion and then applying the dispersion over the region.

7. The article of claim 1, wherein the hydrophobic composite coating comprises the plurality of non-aligned carbon nanotubes in an amount sufficient to form a superhydrophobic surface.

8. The article of claim 1, wherein the article is an oil-less fuser.

9. The article of claim 1, wherein the article is a self-cleaning intermediate transfer belt.

10. The article of claim 1, wherein the article is a xerographic component.

11. The article of claim 1, wherein the composite coating is a superhydrophobic composite coating having a water contact angle of least 150°.

12. An article comprising:

a surface, wherein the surface comprises at least one region;

a porous hydrophobic composite coating disposed over the at least one region, the hydrophobic composite coating being positioned on the surface so as to be exposed to an environment, wherein the hydrophobic composite coating comprises a plurality of non-aligned carbon nanotubes dispersed in a fluoropolymer, the hydrophobic composite coating comprising a sufficient amount of carbon nanotubes to have a water contact angle of least 140°, the hydrophobic composite coating comprising a carbon nanotube loading ranging from about 50% to about 95% by weight of the total solid weight of the hydrophobic composite coating, and an intermediate layer comprising a hydrophobic polymer disposed between the one region and the hydrophobic composite coating, wherein the intermediate layer is porous with an average pore size of less than 0.1 µm, and further wherein the hydrophobic polymer of the intermediate layer is different from the fluoropolymer of the hydrophobic composite coating, wherein the fluoropolymer is selected from a group consisting of polytetrafluoroethylene (PTFE) and perfluoroalkoxy polymer resin (PFA).

13. The article of claim 12, wherein the hydrophobic composite coating is a porous fabric comprising pores with pore sizes ranging from about 0.05 µm to about 5 µm.

14. The article of claim 13, wherein the pores are filled with air.

15. The article of claim 12, wherein the intermediate layer comprises a plurality of carbon nanotubes dispersed in the hydrophobic polymer of the intermediate layer.

* * * * *